(Model.)
E. REYNOLDS.
Feed-Water Heater.
No. 228,478. Patented June 8, 1880.
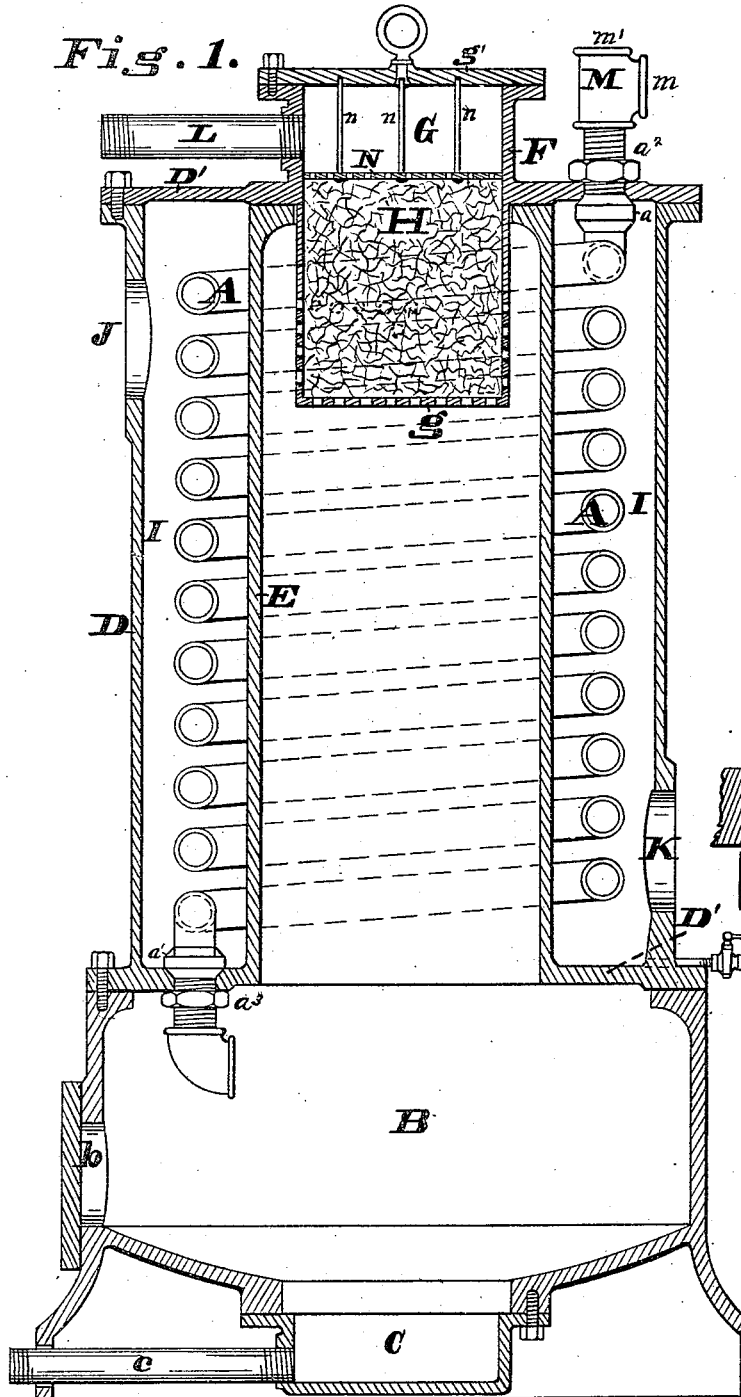
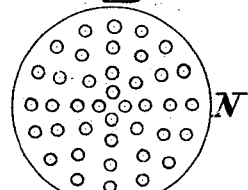
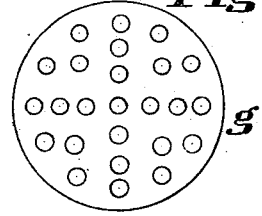
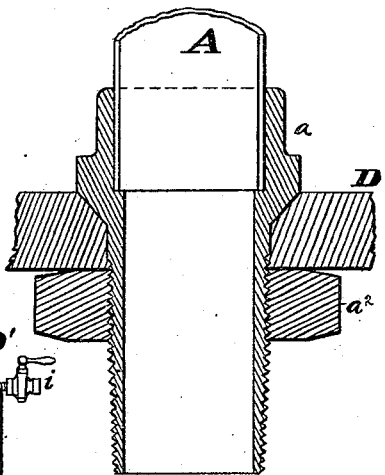
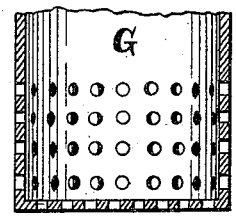
Attest
Collin Ford Jr.
Ambrose Temple
Inventor.
Edwin Reynolds
By John W. Hill
Attorney

UNITED STATES PATENT OFFICE.

EDWIN REYNOLDS, OF MILWAUKEE, WISCONSIN.

FEED-WATER HEATER.

SPECIFICATION forming part of Letters Patent No. 228,478, dated June 8, 1880.

Application filed March 8, 1880. (Model.)

*To all whom it may concern:*

Be it known that I, EDWIN REYNOLDS, of Milwaukee, in the county of Milwaukee and State of Wisconsin, have invented certain new and useful Improvements in Feed-Water Heaters, of which the following is a specification.

My invention relates to that class of feed-water heaters which utilizes the heat in the exhaust-steam from an engine, and has for its object, first, to provide for the distribution of the cold feed-water and the hot exhaust-steam in such a manner as to impart to the water the greatest amount of heat from the steam; second, to provide that the feed-water shall first be heated and then delivered to a settling-chamber, which chamber shall be located below the feed-water heater proper, and shall be subjected to no heat save that imparted to it by the contained heated feed-water, thereby avoiding circulation in the feed-water and insuring a rapid and full precipitation of the organic matter and soluble salts in the water; third, to provide that the feed-water thus purified shall ascend vertically upward through a shell-heater, where it will receive the maximum heat from the exhaust-steam contained in the heater; fourth, to provide that the heated and purified feed-water shall be drawn from the top of the heater through a filter-chamber containing a quantity of hay, straw, or shavings; and, fifth, to provide for the opening and cleansing of the sediment or settling chamber and the filter-chamber without being compelled to stop the connected engine.

In order that the peculiar advantages of my invention may be properly understood it is necessary to briefly state the defects in the several prevailing types of feed-water heaters of the class to which my invention belongs.

The most efficient form of heater is known as the "coil" heater, the feed-water being pumped through a coil of pipe and the exhaust-steam from the engine being delivered to a cylindrical drum surrounding the coil; but this form of heater simply elevates the temperature of the feed-water, and neither precipitates the soluble salts and organic matter nor filters the water before it is pumped into the boiler. The open or spray heater is very efficient both in elevating the temperature of the feed-water and in precipitating the salts and organic matter; but in this form of heater a portion of the exhaust-steam is condensed, and nearly all the oil used in the cylinder of the engine is deposited in the heater, to be finally pumped into the boiler, which is very objectionable.

Another form of heater is arranged to heat the feed-water by passing the exhaust-steam through a system of inverted U-shaped tubes, the opposite ends of which are connected with semi-cylindrical chambers, one of which receives the exhaust from the engine and the other connects with the atmosphere or condenser, according to the type of engine used. The principal objection to this heater is the application of the hot exhaust-steam to the bottom of the water-chamber, which, while it heats the feed-water very excellently, does not, by reason of the constant circulation, precipitate and remove the organic matter and the soluble salts which are almost wholly left in the feed-water, to be deposited in due time on the plates and tubes of the boiler. Another objection to this form of heater is the absence of a filter.

No form of heater, so far as I am aware, has been previously proposed that provides for the combined heating, purification, and filtration of the feed-water while in transit through it.

In the accompanying drawings, Figure 1 is a vertical sectional view of my improved heater. Fig. 2 is a plan view of the perforated plate through which the water is drawn from the filter-chamber. Fig. 3 is a plan view of the perforated bottom of the filter-chamber. Fig. 4 is a sectional view of the nozzle and screw-joint at each end of the water-coil, and Fig. 5 is a sectional view of the lower portion of the filter-chamber.

Similar letters of reference indicate corresponding parts.

A is a coil of iron, brass, or copper pipe, into the upper end of which the cold feed-water is delivered through the nozzle $a$. The water passes downward through the coil and into the settling-chamber B through the nozzle $a'$. The settling-chamber is preferably made of cast-iron, with an inclined bottom to throw the precipitated matter into the mud-well C, from which the sediment may be blown out from time to time through the blow-off pipe

*c*. In addition to the mud-well and blow-off pipe, the settling-chamber is also provided with a large hand-hole and cover, *b*, which can be opened whenever necessary and the bottom of the chamber examined and cleaned.

Above the settling-chamber B, and secured thereto by flanges and bolts, I place the heater, consisting of the concentric shells D and E. The cap F of the heater is secured by bolts to flanges upon both the inner and outer shells, as clearly shown in Fig. 1, and contains the filter-chamber G. The filter-chamber consists of a cylinder having a smaller diameter than the shell or cylinder E, and projected for nearly three-fourths its length into the heater. The bottom and shell of the filter-chamber are perforated, as shown in Figs. 3 and 5, and the top is closed by a solid circular cap, *g'*, secured to the flange by means of bolts or tap-screws.

H is the filtering material, of shavings, straw, or any other suitable substance, which is placed in the lower portion of the chamber G, and held in position against the lifting and floating tendency of the water by means of the perforated plate N, as shown in Fig. 2. The perforations in the plate N are sufficiently small to prevent any of the filtering material from passing through the plate and into the feed-pipe.

I is the annular space between the shells or cylinders D and E, into which the exhaust-steam is conducted through the opening J, and from which it is taken to the atmosphere or condenser through the opening K.

The coil A is placed midway between the shells D and E, in order that the circulation of steam around each revolution of the coil shall be complete.

*i* is a drain-cock to remove the condensation which will occur in the annular space I.

The perforated plate N is rigidly secured to the cap *g'* by the studs *n n n*, and any degree of compression of the filtering material H may be had by filling the chamber G with the requisite quantity of filtering material and then forcing the cap *g'* and plate N into the position shown in the drawings.

The supernatant feed-water is drawn off through the pipe L and fed into the boiler.

The nozzle *a* on the upper end of the coil is provided with a T, M, in the opening *m* of which the cold-water feed-pipe is screwed, and into the opening *m'* of which a steam-pipe is screwed, for blowing out any deposits or other obstructions that may occur in the coil A. Thus should any scale be precipitated and fasten in the coil with the temperature of the water and coil at or near 200° Fahrenheit, then by stopping the flow of water into the T M at *m*, and by turning on the live steam through *m'*, the coil would be heated to a temperature much above that of the exhaust-steam, and by the natural expansion of the pipe in the coil the scale would be loosened and blown into the settling-chamber B.

Should the scale at any time prove intractable and refuse to move upon blowing steam through the coil, then by removing the steam-connection at *m'* an acid solution, or petroleum, or any other suitable detergent may be poured into the coil for the removal of the obstructions. As a matter of fact, however, the precipitation of the salts in solution or the organic matter in the water in the coil will be a rare occurrence, owing to the natural velocity at which the water passes through the coil.

In operation the coil A, settling-chamber B, cylinder E, and filter-chamber G are always full of water under boiler-pressure, the feed-pump being located on the cold-water side of the heater and forcing the water through the heater as though it (the heater) were a pipe. The space I being always filled with the exhaust-steam from the engine, the feed-water is first heated nearly to the temperature of the exhaust-steam before it is delivered to the settling-chamber B. From the settling-chamber the water slowly ascends in the cylinder E, and finally is drawn through the filter-chamber G, where any material in the water not capable of precipitation is intercepted by the filtering material H, and the water passes through the perforations in the plate N and out of the feed-pipe L thoroughly purified of soluble salts and organic matter, and filtered.

It will be observed that no heat is applied to the settling-chamber B, save what heat may be imparted to it from the contained feed-water, and that the circulation in the feed-water is promptly checked upon entering the settling-chamber, thereby obtaining a quick and complete precipitation of such matter in the water as can be removed by the application.

Whatever loss of heat in the feed-water may occur in the settling-chamber is resupplied to the water as it ascends in the cylinder E.

The construction of the heater is extremely simple, and the renewal of the coil, should this ever be necessary, is specially provided for in the nozzle and screw-joint shown in Fig. 4. The nozzle *a* is turned to fit a conical seat in the casting D', and threaded upon the outside for the lock-nut $a^2$, when by simply inserting the nozzle into the casting and forcing up the nut $a^3$ a steam-tight joint is made without lead or a gasket. The nozzle is bored out to receive the end of the coil A. The nozzle at the bottom of the coil is precisely like that at the top of the coil.

I am aware that a feed-water heater consisting of a water-coil submerged in exhaust-steam is not new, and that filter-chambers containing filtering material have been in use for some years. These features I do not claim.

Having described my invention, what I claim is—

1. In feed-water heaters for utilizing the heat of the exhaust-steam, the settling-chamber B, with the detachable mud-well C and blow-off *c*, all constructed and arranged as shown, and for the purpose specified.

2. In a feed-water heater, the coil A, for the downward passage of the water, and surrounded by the exhaust-steam, in combination with the settling-chamber B, substantially as shown, and for the purpose described.

3. In a feed-water heater, the combination of the coil A, surrounded by the exhaust-steam, and the settling-chamber B, with the inner cylinder, E, surrounded by the exhaust-steam, all constructed and arranged substantially as shown, and for the purpose specified.

4. In a feed-water heater, the combination of the coil A and settling-chamber B with the inner cylinder, E, and filtering-chamber G, containing filtering material, all arranged substantially as shown and specified.

5. In a feed-water heater, the combination of the outer cylinder, D, and inner cylinder, E, with the coil A, settling-chamber B, and filtering-chamber G, all arranged substantially as shown and described.

6. In a feed-water heater, the perforated filtering-chamber G, having a perforated bottom and solid cap $g'$, in combination with the perforated plate N, with studs $n\ n\ n$, and filtering material H, substantially as and for the purpose specified.

7. In a feed-water heater, the combination of the nozzle $a$, provided with a conical shoulder to fit a conical seat in the plate D', and threaded upon one end for the lock-nut $a^2$, and bored out at the opposite end for attachment to the coil A and plate D', substantially as and for the purpose described.

In testimony whereof I have signed my name to the foregoing specification in the presence of two subscribing witnesses.

EDWIN REYNOLDS.

Witnesses:
  WILLIAM S. CHASE,
  OTTA PUPIKOFER.